UNITED STATES PATENT OFFICE.

CARLETON ELLIS, OF LARCHMONT, NEW YORK, ASSIGNOR TO CHADELOID CHEMICAL COMPANY, OF NEW YORK, N. Y., A CORPORATION OF WEST VIRGINIA.

FINISH-REMOVER.

1,102,330.     Specification of Letters Patent.     Patented July 7, 1914.

No Drawing.     Application filed December 4, 1907. Serial No. 405,025.

*To all whom it may concern:*

Be it known that I, CARLETON ELLIS, a citizen of the United States, and resident of Larchmont, in the county of Westchester and State of New York, have made a certain new and useful Invention Relating to Finish-Removers, of which the following is a specification, this application comprising divisional subject-matter taken from my co-pending application, No. 364,749, filed March 27, 1907.

This invention relates to finish removers and relates especially to removers comprising carbolic, cresylic or analogous acid bodies combined with suitable proteid palliatives by which their corrosive or caustic action may be neutralized.

Carbolic and cresylic acid and their higher homologues, guaiacol, beechwood tar acid and other acid bodies of similar character derived from wood, coal, etc., by destructive distillation, including creosotes derived from wood and coal tar, shale oil and blast furnace products are sometimes desirable in removers that are used under extreme service conditions because of their energetic loosening action on many paints and finishes. These materials are, however, disadvantageous because of their caustic and corrosive action on the workmen and finish surfaces to which they are applied under certain circumstances. By the use of suitable palliative material, however, such corrosive properties may be mitigated and neutralized without destroying the desirable loosening action on the finish and the remover rendered much more satisfactory in its action. Proteid bodies have a desirable pallative action of this character, albumen and gelatin forming when stirred into carbolic acid a desirable thick pasty mass, giving consistency to the remover as well as having a very desirable palliative action on the carbolic acid or other acid bodies referred to, it being understood, of course, that such acid bodies may be replaced to the extent of a few per cent. or so with other acids preferably of an organic character, such as tartaric, oxalic, lactic and other similar acids. In removers, it is desirable to use in addition to such acid bodies and palliative material suitable finish solvent material preferably of a mixed character comprising true alcohols, such as methyl, ethyl, propyl, butyl, amyl, benzyl, and the like, preferably in their commercial forms including denatured alcohol, as well as various ketonic solvents including acetone, methyl acetone, acetone oil, as well as aldehydes and esters of various kinds. Other desirable solvents are benzol and its homologues and the petroleum hydrocarbons, such as gasolene, as well as carbonbisulfid, carbon-tetrachlorid, acetylene tetrachlorid and other chlorinated solvent compounds, turpentine, wood turpentine, pine oil, resin spirits, spruce turpentine and the like.

Although not necessary in all cases, various stiffening materials, such as wood flour, starch, whiting, fullers' earth, magnesia, sodium silicate, infusorial earth, may be used, and also waxy, soapy, or nitro-cellulose stiffening material, it being, of course, understood that all the ingredients are preferably thoroughly incorporated by agitation at the desired slight rise of temperature.

In preparing removers of this character, gelatin, which may be used if desired in the form of commercial glue, or other proteid bodies such as albumen may be stirred into carbolic, cresylic or acid solvent material preferably when slightly heated, the rapidity of solution being promoted by slightly heating to 150 or 200° Fahrenheit so as to form a thick mass when 20% of glue is dissolved in carbolic acid, for instance. The other finish solvent material mentioned may be incorporated with this proteid solution by agitation while still hot. Although this invention is not necessarily limited thereto, a suitable illustrative remover of this character may comprise 20 parts of a 20% solution of gelatin in carbolic acid, 12 parts of benzol, 8 parts of wood alcohol and 1 part of ceresin wax. Another similar illustrative remover may comprise 2 parts of a 20% solution of glue or gelatin in carbolic acid, 1 part of benzol and 1 part of wood alcohol. Another illustrative remover may comprise 8 parts of a 20% solution of glue in cresylic acid, 4 parts of acetone and 1 part of turpentine. Another illustrative remover may comprise 1 part of a 25% solution of glue in carbolic acid and 1 part of wood alcohol. Another illustrative remover may comprise a solution of 5% of glue and 5% of albumen in carbolic acid. Another illustrative remover may comprise 1 part of glue, 5 parts of crude carbolic acid which contains, of course, considerable cresylic acid, 1 part of toluol, 1 part of gasolene, 3 parts of methyl acetone, ¼ part of paraffin wax, if desired, and ½ part of concentrated lactic acid. Another illustrative remover may comprise 1 volume of a 10% solution of glue in glycerin combined with 2 volumes of carbolic acid with which may be combined, if desired, 3 volumes of benzol and 2 volumes of acetone. Of course the proportions of the ingredients may be varied considerably and by using a greater proportion of the proteid material considerably thicker removers may be produced which are rather more desirable for some purposes.

Having described this invention in connection with a number of illustrative ingredients and formulas, to the details of which disclosure the invention is not, of course, to be limited, what is claimed as new and what is desired to be secured by Letters Patent is set forth in the appended claims.

I claim—

1. The finish remover comprising substantially 20 parts of a 20% solution of gelatin in carbolic acid, 12 parts of benzol, 8 parts of wood alcohol and 1 part of ceresin wax.

2. The finish remover comprising approximately 20 parts of a 20% solution of gelatin in phenolic acid material, 12 parts of benzolic material, 8 parts of alcohol and 1 part of waxy material.

3. The finish remover comprising approximately 20 parts of a 20% solution of palliative proteid material in phenolic acid material combined with waxy material and 20 parts of volatile finish solvent material including alcoholic material.

4. The finish remover comprising a solution of proteid palliative material in phenolic acid material combined with a substantially equal proportion of volatile organic finish solvent material including an aromatic hydrocarbon.

5. The finish remover comprising a solution of proteid palliative material in carbolic acid combined with a substantially equal proportion of volatile organic finish solvent material including benzol.

6. The substantially fluent finish remover comprising phenolic acid material with which proteid palliative thickening material has been combined and at least fifty per cent. of composite substantially neutral volatile finish solvent material incorporated therewith.

7. The finish remover comprising carbolic acid material with which gelatinous palliative material has been combined and composite volatile finish solvent material incorporated therewith.

8. The finish remover comprising a plurality of finish solvents and phenolic acid material with which gelatinous palliative material has been combined to thicken the same.

9. The finish remover comprising a plurality of finish solvents and carbolic acid with which gelatinous proteid palliative material has been combined.

10. The substantially fluent finish remover substantially free from corrosive alkali and comprising at least fifty per cent. of a plurality of volatile finish solvents and comprising phenolic acid material with which proteid palliative material has been incorporated.

11. The substantially fluent finish remover comprising composite volatile finish solvent material and incorporated carbolic acid and proteid palliative material dissolved in said carbolic acid.

12. The finish remover comprising proteid palliative material, phenolic acid material, waxy material and composite volatile finish solvent material incorporated therewith.

13. The substantially fluent finish remover comprising a solution of colloidal palliative material in phenolic acid material combined with a plurality of volatile finish solvents.

14. The substantially fluent finish remover comprising phenolic acid material with which colloidal palliative material has been combined and comprising fifty per cent. at least of composite finish solvent material incorporated therewith.

15. The finish remover comprising phenolic acid material with which proteid palliative material has been combined and a plurality of finish solvents incorporated therewith.

16. The finish remover comprising acid material including phenolic material with which proteid palliative material has been combined and comprising at least fifty per cent. of a plurality of finish solvents incorporated therewith.

17. The substantially fluent finish remover comprising acid material including phenolic material with which proteid palliative material has been combined and a considerable proportion of substantially neutral finish solvent material including benzol incorporated therewith.

18. The substantially fluent finish remover comprising acid material including phenolic material in which proteid palliative material has been dissolved and a plurality of finish solvents incorporated therewith.

19. The substantially fluent finish remover comprising acid material including phenolic material with which colloid palliative material has been combined and a plurality of neutral volatile finish solvents including benzol incorporated therewith.

20. The finish remover comprising proteid palliative material, phenolic acid material, waxy material and finish solvent material incorporated therewith.

21. The substantially fluent finish remover comprising finish softening material and comprising phenolic acid material and proteid palliative material dissolved in said phenolic acid material.

CARLETON ELLIS.

Witnesses:
 HARRY L. DUNCAN,
 JESSIE B. KAY.